June 21, 1960   C. E. QUINBY   2,941,538
MAXIMUM SPEED LIMITER
Filed Oct. 18, 1954

INVENTOR.
CHARLES E. QUINBY
BY Whittemore,
Hulbert & Belknap
ATTORNEYS

United States Patent Office 2,941,538
Patented June 21, 1960

2,941,538

MAXIMUM SPEED LIMITER

Charles E. Quinby, Oak Park, Mich., assignor to Holley Carburetor Company, Detroit, Mich., a corporation of Michigan Filed Oct. 18, 1954, Ser. No. 462,820

10 Claims. (Cl. 137—48)

The present invention relates to a maximum speed limiter.

The invention is applicable to the control of the fuel supply for gas turbines but may have other applications as will be readily apparent.

Gas turbines for example may include a fuel supply including a shaft rotatable at high speed and including a fuel passage extending longitudinally to the end of the shaft which is located in or adjacent to a combustion chamber. The specific embodiment of the present invention which has been chosen for illustration is in the form of means associated with the rotary tubular fuel supply shaft adapted to operate to control or limit speed and to exert a controlling influence dependent in part upon acceleration.

It is an object of the present invention to provide engine control means including elements relatively movable in response to the simultaneous action of forces derived from both instantaneous speed and acceleration.

More specifically, it is an object of the present invention to provide engine control means comprising a first member rotatable at speeds dependent upon engine speed, a second member concentric with said first member and rotatable relative thereto, means interconnecting said members whereby said first member drives said second member, said means being movable in response to a predetermined maximum speed or in response to a predetermined maximum acceleration, or inter-dependent values of speed and acceleration to reduce engine speed.

More specifically, it is an object of the present invention to provide structure as described in the preceding paragraph in which said members are formed to constitute valving means for controlling supply of fuel to the engine.

It is a further object of the present invention to provide a tubular fuel supply shaft for an engine rotatable in accordance with engine speed, an inner sleeve and shroud assembly fixed to said shaft, a fuel passage extending from said shaft into a fuel chamber defined by said inner sleeve and shroud, a valve sleeve rotatable on said inner sleeve, said inner sleeve and valve sleeve having relatively movable valve ports, resilient means intermediate said sleeves biasing said valve sleeve toward full open position, weighted levers intermediate said sleeves operable to shift said valve sleeve toward closed position in response to the attainment of a predetermined high angular velocity, a predetermined high rate of acceleration, or a combination of both.

Other objects and features of the invention will become apparent as the description proceeds, especially when taken in conjunction with the accompanying drawings, wherein.

Figure 2:
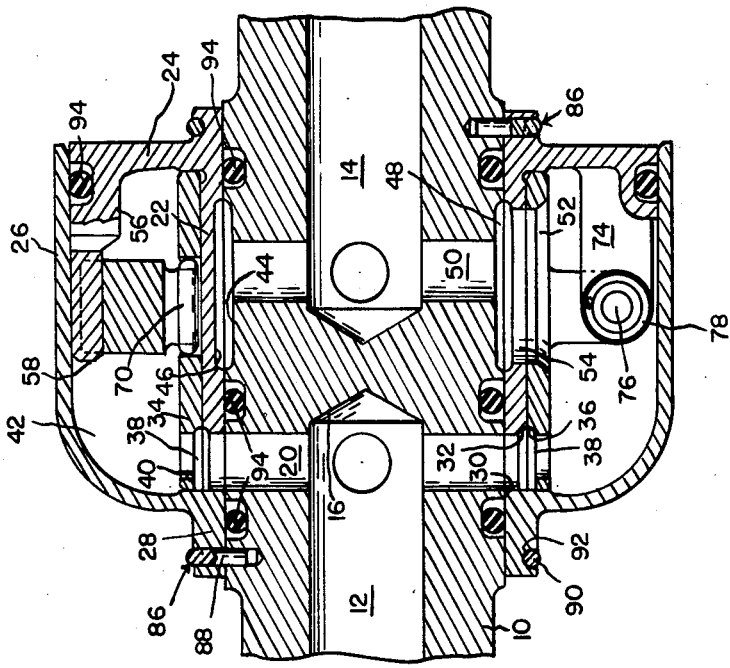
Figure 2 is a sectional view taken on the line 2—2, Figure 1.

The maximum speed limiter comprises a shaft 10 adapted to be rotated by suitable means (not shown) at a speed dependent upon the speed of an engine, such for example as a gas turbine. The shaft 10 is provided with an axially extending inlet passage 12 and an axially extending outlet passage 14, the two being provided by coaxial bores terminating short of each other and leaving an intermediate partition or wall 16 therebetween.

Extending radially from the inner end of the inlet passage 12 are a plurality of fuel passages 20. Carried by the shaft 10 is an annular fuel chamber comprising an inner sleeve 22 having a radially extending flange 24 at one end and a shroud 26 having a tubular flange 28 engaging the shaft 10. The inner sleeve 22 is provided with a series of ports 30 extending outwardly to an annular groove or reduced portion 32 extending completely around the inner sleeve 22.

Rotatable on the inner sleeve 22 is a valve sleeve 34 having at the left hand end thereof, as seen in Figure 2, an inner annular groove or enlarged portion 36 which cooperates with the portion 32 to form a complete annular channel 38. In addition, the valve sleeve 34 is provided with radial ports 40 communicating with the annular channel 38 so that fuel may flow through the passages 12 and 20 into the annular channel 38 and through the passages 40 into the chamber 42 formed by sleeve 22, flange 24 and shroud 26.

The shaft 10 is provided with a complete annular groove 44 which registers with a groove 46 formed at the interior of the inner sleeve 22, the two grooves together forming a complete annular channel 48. The channel 48 connects through radial passages 50 in the shaft 10 which extend into the fuel outlet passage 14.

In order to control the flow of fluid from the chamber 42, the valve sleeve 34 is provided with a plurality of axially elongated radially extending slots 52 which register with corresponding axially elongated radially extending slots 54 formed in the inner sleeve 22. When the slots 52 and 54 are in registration as seen in Figure 1, substantially free flow of fluid is permitted from fuel inlet passage 12 through the speed limiter to outlet passage 14.

Figure 1:
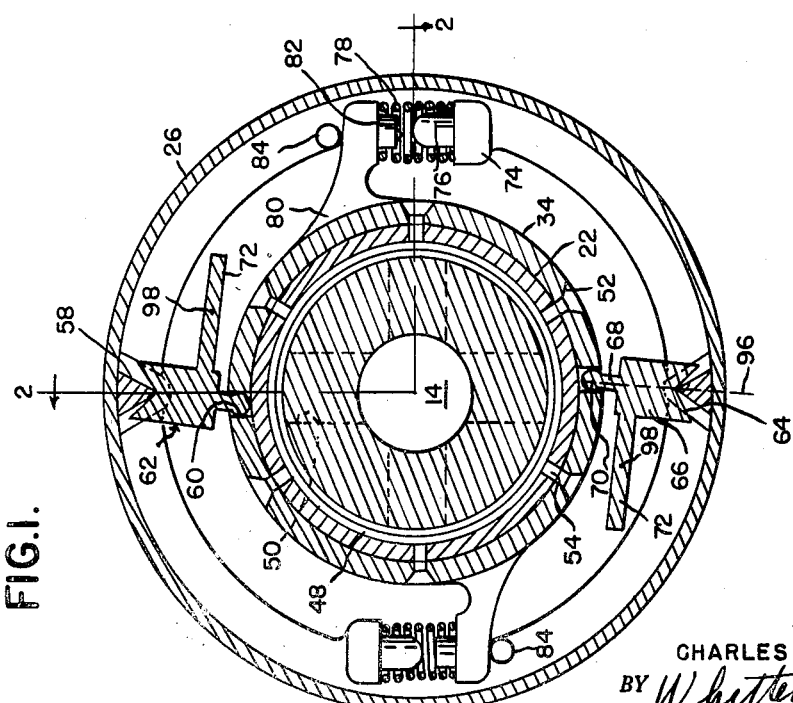
Figure 1 is a sectional view through the maximum speed limiter taken perpendicular to its axis.

Extending axially inwardly of the chamber 42 from the flange 24 are a pair of embossments 56 terminating in knife edged extensions 58, as best illustrated in Figure 1. The valve sleeve 34 is provided with a pair of elongated slots 60. Extending between the knife edged extensions 58 and the slots 60 are a pair of weighted levers indicated generally at 62. The levers 62 are provided with a concave seat 64 including a bottom portion engaged by the knife edges of the extensions 58 so that the levers 62 may rock on the knife edges. The weighted levers 62 include an elongated generally rectangular body portion 66 terminating in a web 68 which connects the body portion to a cylindrical portion 70 at the inner end thereof. The cylindrical portion 70 fits within the slot 60 and serves to transmit forces tending to rotate the valve sleeve 34 as will subsequently be described.

The weighted levers 62 also include centrifugal elements 72 which are illustrated as cylindrical and as extending laterally from the body portion 66 so as to be particularly responsive to instantaneous angular velocity.

In order to retain the valve sleeve 34 in the position illustrated in Figure 1, or its full open position, spring seats 74 are provided extending axially inwardly of the chamber 42 from the flange 24. The spring seats 74 include reduced pilot portions 76 serving to locate and guide compression springs 78. The valve sleeve 34 is provided with generally radially extending arms 80 having projections 82 extending into the opposite ends of the compression springs and cooperating with the spring guides 76 to retain the springs in operative position. The projections 82 and 76 also serve the additional function of limiting rotational movement of the valve sleeve 34 relative to the inner sleeve 22 to a position in which opposite edges of the slots 54 and 52 are in alignment. In other words, closing movement of the valve sleeve 34 is limited to a position in which the valve is just barely closed without any overlap between valving surfaces. It will be apparent that the force developed by the springs 78 with the valve fully open determines the speed at which said valve starts to close.

In addition, the radial flange 24 carries stop pins 84 engageable with the arms 80 to limit opening movement of the valve sleeve 34 to the full open position illustrated in Figure 1. It will be apparent that further movement of the valve sleeve from its closed position would result in restriction of the valve passages.

The inner sleeve 22 and the shroud 26 are pinned to the shaft 10 by spring pinning devices 86 which include radially inwardly extending end portions 88 as well as annular portions 90, the latter being seated in annular grooves 92. Suitable seals such for example as the O-rings indicated at 94 are provided.

The weighted levers 62 are so designed that the relatively massive generally rectangular body portion 66 thereof has its center of gravity located along a center line designated at 96, passing through the axes of cylindrical portions 70 and the bottom of seats 64. The centrifugal elements 72 of course have centers of gravity located substantially at the points designated 98. The center of gravity of the combined body portions 66 and element 72 must of course lie in a clockwise direction from a radial line passing through the apex of element 58, as seen in Figure 1, to apply centrifugal forces in a direction to compress the springs 78, and hence moves further from such line upon rocking about the element 58. The relative movement permitted the valve sleeve 34 is such that when the valve is in fully closed position as determined by engagement between spring locators 76 and projections 82, the center of gravity of the body portions 66 of the weighted levers falls on a line radial of the assembly and passing through the associated knife edge of the element 58. Thus, at this time, the centrifugal forces developed by elements 72 are unopposed by other centrifugal forces and are fully effective to hold the valves closed. Accordingly, the weighted levers 62 during rotation of the shaft 10 may be considered as subject to two opposed centrifugal forces. The centrifugal force developed by the body portion 66 tends to rotate the weighted levers 62 about axes determined by the knife edges of the elements 58 in a clockwise direction. On the other hand, the centrifugal forces developed by the cylindrical centrifugal elements 72 tend to rotate the weighted levers 62 in a counterclockwise direction about the pivot axis established by the knife edges of the elements 58. Thus, the centrifugal forces developed by the two different portions of the weighted levers oppose each other. Moreover, the centrifugal force developed by the body portion 66 of the weighted levers becomes zero when the valve sleeve 34 has been shifted to full open position of the valves. At this time the center of gravity of the body portion 66 of each weighted lever is on a line radial of the assembly and passing through the knife edge of the element 58.

With the foregoing in mind it will be apparent that as the shaft 10 approaches a predetermined maximum speed, the centrifugal forces attributable to the centrifugal elements 72 tend to overcome the forces applied by the prestressed springs 78 and to rotate the valve sleeve 34 toward closed position. At some speed, such for example as 60,000 r.p.m., an equilibrium is established and the centrifugal forces tending to rotate the weighted levers 62 just balances the forces developed by the spring. Any increase in speed above this predetermined value will result in some compression of the spring and partial closing of the valve. Moreover, initial movement of the weighted levers 62 immediately reduces the arm of the body portion 66 of the weighted levers and at the same time increases the effectiveness of the arm of the cylindrical centrifugal portions 72 thereof. This tends to render the device rather sensitive since initial closing of the valves is accompanied by movement of the weighted levers in a direction to increase the net effectiveness of the opposing centrifugal forces so as to produce further closure of the valves. In a typical installation the device operates to initiate valve closure at a speed of 60,000 r.p.m. and to complete closure of the valves at 63,000 r.p.m.

A second very important function of the weighted levers and associated structure is to render the valves sensitive not only to instantaneous velocity as a result of centrifugal force developed thereby, but also to acceleration. The weighted levers 62 together with the valve sleeve 34 constitute structure driven from the shaft 10 through the compression springs 78. The inertia of the structure comprising the valve sleeve 34, but more particularly the weighted levers 62, opposes acceleration of the sleeve so that during acceleration forces are developed dependent upon the rate of acceleration tending to cause the weighted levers 62 to rotate counterclockwise about the pivot axes determined by the knife edges of the extensions 58 and thus tending to produce closure of the valves. The center of mass of the weighted lever 62 is relatively close to a line joining its points of connection to the rotary member. Moreover, the amount of relative angular movement between the rotary members permitted by the abutment 84 and engagement between the pilot portion 76 and projection 82 is such that the center of mass of the weighted lever 62 remains quite close to this position so that the response of the apparatus to acceleration and deceleration is substantially uniform.

The inter-dependency between instantaneous velocity and the rate of acceleration is particularly important in the application of the present invention to engines such for example as gas turbines in which acceleration and velocity at full throttle both increase. As a result of this, as the turbine approaches its upper velocity limit, it is approaching this limit at an increasing rate of acceleration. Since the net effect of velocity and acceleration is to tend to produce valve closure, it will be apparent that permissible acceleration will be reduced as the turbine approaches its permissible angular velocity. When the relative influence of velocity and acceleration are properly balanced, the turbine may be caused to reach its maximum velocity without substantially overshooting it and to attain a steady maximum velocity without severe hunting tendency.

It will further of course be apparent that when maximum velocity is attained the acceleration limiting factor is ineffective so that an ultimate definite maximum velocity is attained.

The acceleration control is however effective to operate in conjunction with the remaining structure to produce uniform velocity at the selected maximum rate. This is because on deceleration inertia tending to maintain the valve sleeve and weighted levers at their former velocity has the effect of tending to open the valves.

While the present invention has been illustrated and described in some detail as applied to fuel control, particularly for gas turbines, it will be appreciated that certain aspects of the invention are capable of much broader use. Thus for example, the concept of employing two rotatable elements interconnected by weighted levers or the equivalent so as to render relative movement between the two members responsive jointly to instantaneous angular velocity and acceleration could be employed in conjunction with many widely different devices. Thus for example, instead of controlling admission of fuel to an internal combustion engine, the arrangement could control emission of steam to a turbine or the like, or could be arranged to effect speed control by electrical contacts carried by the relatively movable members or the like.

The drawings and the foregoing specification constitute a description of the improved maximum speed limiter in such full, clear, concise and exact terms as to enable any person skilled in the art to practice the invention, the scope of which is indicated by the appended claims.

What I claim as my invention is:

1. A maximum speed limiter comprising a rotatable fuel supply shaft having separate fuel inlet and outlet passages, a fuel chamber surrounding said shaft, a passage connecting said fuel inlet passage and said chamber, a second passage normally connecting said chamber to said fuel outlet passage, a valve sleeve concentric with and rotatable relative to said shaft and having a port movable across the outer end of said second passage, resilient torque transmitting means yieldingly connecting said sleeve to said shaft, and weighted levers having inner ends engaging said sleeve and pivot means supporting said levers radially outwardly from said sleeve, said levers having centers of gravity located with reference to said pivot means to cause centrifugal force and acceleration to tend to swing said levers in a direction to move said port out of registry with said second passage.

2. Apparatus as defined in claim 1 in which said weighted levers are pivotally mounted on knife edges located adjacent the outer wall of said chamber.

3. Apparatus as defined in claim 1 which comprises abutment means intermediate said shaft and sleeve limiting said sleeve to movement between a valve open position in which said port is in full registry with said passage, and a valve closed position in which said port is just out of registration with said passage.

4. Maximum speed limiting apparatus comprising a rotatable fuel supply shaft having coaxial fuel inlet and outlet passages, and a partition separating said passages, an inner sleeve fixed to said shaft, an annular shroud surrounding said sleeve and cooperating therewith to define an annular fuel chamber, a valve sleeve in said chamber rotatable on said inner sleeve, continuously open passage means connecting said inlet passage to the interior of said chamber, passages connecting said outlet passage to the exterior of said inner sleeve, said valve sleeve having ports movable into and out of registration with the outer ends of said last named passages, resilient means connecting said sleeves, and weights pivoted within said chamber and having valve actuating portions engaging said valve sleeve, the pivot axes of said weights being located with reference to their center of gravity such that centrifugal force and acceleration both tend to move said valve sleeve in valve closing direction.

5. Apparatus as defined in claim 4 comprising knife edges forming pivot supports for said weights.

6. Apparatus as defined in claim 4 comprising knife edges located adjacent the outer wall of said chamber on which said weights are supported.

7. Speed control apparatus comprising a pair of relatively rotatable concentric members respectively having ports movable into and out of registration to operate as valve means as said members rotate relatively, a fuel passage controlled by said valve means, stops limiting relative rotation between said members, resilient torque transmitting means yieldably connecting said members and urging them against one of said stops in which position said ports are in registration, and weighted pivotally mounted levers operatively connected to one of said members and having centers of gravity located with reference to the pivot axes thereof to cause centrifugal force to tend to swing said levers in a direction to move said ports out of registration, the inner ends of said levers engaging one of said members, and the outer ends of said levers being pivoted on knife edges carried by said other member.

8. Speed control apparatus for a device, said apparatus comprising a rotatable driving member, a driven control member movable relative to said driving member about its axis of rotation, resilient means connected between said members and constituting a driving coupling therebetween, speed and acceleration responsive means comprising a weighted lever pivotally connected to said members at substantially radially separated points, the center of mass of said lever being located close to the line joining the points of connection of said lever to said members to render said apparatus responsive to acceleration and deceleration of said driving member, and said center of mass being located laterally from said line to render said apparatus responsive to speed of said driving member.

9. Speed control apparatus for a device, said apparatus comprising a rotatable driving member, a driven control member movable relative to said driving member about its axis of rotation, resilient means connected between said members and constituting a driving coupling therebetween, speed and acceleration responsive means comprising a weighted lever pivotally connected to said members at substantially radially separated points, the center of mass of said lever being located close to the line joining the points of connection of said lever to said members to render said apparatus responsive to acceleration and deceleration of said driving member, said center of mass being located laterally from said line to render said apparatus responsive to speed of said driving member, and rigid abutment means limiting relative angular movement between said members to maintain the response of the apparatus to acceleration and deceleration substantially uniform throughout the range of movement permitted said members.

10. Speed control apparatus for a device, said apparatus comprising a rotatable driving member, a driven control member movable relative to said driving member about its axis of rotation, resilient means connected between said members and constituting a driving coupling therebetween, speed and acceleration responsive means comprising a weighted lever pivotally connected to said members at substantially radially separated points, the center of mass of said lever being located close to the line joining the points of connection of said lever to said members to render said apparatus responsive to acceleration and deceleration of said driving member, said center of mass being located laterally from said line in a direction to cause movement of said lever in response to centrifugal forces to increase the effective torque arm of said weighted lever.

References Cited in the file of this patent

UNITED STATES PATENTS

| | | |
|---|---|---|
| 838,725 | Larkin | Dec. 18, 1906 |
| 1,759,641 | Cook | May 20, 1930 |
| 1,785,285 | Robertson | Dec. 16, 1930 |
| 2,549,748 | Purdy | Apr. 17, 1951 |
| 2,633,830 | McCourty et al. | Apr. 7, 1953 |
| 2,687,195 | Gleasman | Aug. 24, 1954 |
| 2,702,560 | Bobier | Feb. 20, 1955 |

FOREIGN PATENTS

| | | |
|---|---|---|
| 200,867 | Great Britain | July 16, 1923 |